United States Patent
Nazarian et al.

(10) Patent No.: US 11,414,345 B2
(45) Date of Patent: Aug. 16, 2022

(54) SEAMLESS, AND/OR GRADED TRANSITION FROM SINTERED ALTERNATIVE-BINDERS-BASED IMPERMEABLE CONCRETE TO GLASS FOR ARCHITECTURAL AND INDUSTRIAL APPLICATIONS

(71) Applicant: The Penn State Research Foundation, University Park, PA (US)

(72) Inventors: Shadi Nazarian, University Park, PA (US); Carlo Pantano, University Park, PA (US); Paolo Colombo, University Park, PA (US); Mauro Marangoni, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 979 days.

(21) Appl. No.: 16/159,121

(22) Filed: Oct. 12, 2018

(65) Prior Publication Data

US 2019/0047910 A1 Feb. 14, 2019

Related U.S. Application Data

(63) Continuation-in-part of application No. PCT/US2017/027976, filed on Apr. 17, 2017.
(Continued)

(51) Int. Cl.
*C03C 27/00* (2006.01)
*C04B 28/00* (2006.01)
(Continued)

(52) U.S. Cl.
CPC ............ *C03C 27/00* (2013.01); *C04B 28/006* (2013.01); *C04B 33/138* (2013.01);
(Continued)

(58) Field of Classification Search
CPC ... C03C 27/00; C04B 28/006; C04B 33/1352; C04B 33/138; C04B 35/19; C04B 35/195; C04B 37/042; C04B 2111/00612
See application file for complete search history.

(56) References Cited

U.S. PATENT DOCUMENTS 2,149,133 A 2/1939 Cohn
2,227,770 A * 1/1941 Ungewiss ............... C04B 33/02
428/164

(Continued)

FOREIGN PATENT DOCUMENTS

DE 29900428 * 5/2000
DE 29900428 U1 5/2000
(Continued)

OTHER PUBLICATIONS

DE29900428 machine translation (Year: 2000).*
(Continued)

*Primary Examiner* — Karl E Group
*Assistant Examiner* — Cameron K Miller
(74) *Attorney, Agent, or Firm* — Dinsmore & Shohl LLP

(57) ABSTRACT

Materials that seamlessly transition from opaque to transparent or translucent, such as advanced geopolymer-based ceramics to glass structures, which can be directly and seamlessly bonded without the use of an intermediate adhesive or use of a frame are disclosed. That is, a GP-based ceramic to glass structure can be bonded directly and seamlessly and without any mechanical joints, connective tissue or adhesives such as caulking or epoxy. Such ceramic to glass materials can be prepared by sintering an engineered geopolymer with glass to form the geopolymer-based advanced ceramic-glass structure in which the interface is
(Continued)

visually abruptly or in which the material is a graded composition with a controlled transition from one material to the other.

15 Claims, 8 Drawing Sheets

Related U.S. Application Data

(60) Provisional application No. 62/322,864, filed on Apr. 15, 2016.

(51) Int. Cl.
| | | |
|---|---|---|
| *C04B 33/135* | (2006.01) | |
| *C04B 33/138* | (2006.01) | |
| *C04B 35/19* | (2006.01) | |
| *C04B 35/195* | (2006.01) | |
| *C04B 37/04* | (2006.01) | |
| *C04B 111/00* | (2006.01) | |
| *C04B 111/80* | (2006.01) | |

(52) U.S. Cl.
CPC .......... *C04B 33/1352* (2013.01); *C04B 35/19* (2013.01); *C04B 35/195* (2013.01); *C04B 37/042* (2013.01); C04B 2111/00612 (2013.01); C04B 2111/80 (2013.01); C04B 2235/3201 (2013.01); C04B 2235/3206 (2013.01); C04B 2235/3208 (2013.01); C04B 2235/3232 (2013.01); C04B 2235/3272 (2013.01); C04B 2235/349 (2013.01); C04B 2235/3427 (2013.01); C04B 2235/36 (2013.01); C04B 2235/6562 (2013.01); C04B 2235/6565 (2013.01); C04B 2235/6567 (2013.01); C04B 2235/662 (2013.01); C04B 2235/72 (2013.01); C04B 2235/77 (2013.01); C04B 2235/96 (2013.01); *C04B 2235/9607* (2013.01); *C04B 2237/341* (2013.01); *C04B 2237/58* (2013.01); *Y02P 40/10* (2015.11); *Y02P 40/60* (2015.11)

(56) References Cited

U.S. PATENT DOCUMENTS

| | | | |
|---|---|---|---|
| 4,833,015 A | | 5/1989 | Furuuchi et al. |
| 4,879,159 A | * | 11/1989 | Furuuchi ................ C03B 19/08 |
| | | | 428/161 |
| 6,532,769 B1 | | 3/2003 | Meinhardt et al. |
| 7,695,560 B1 | | 4/2010 | Buarque de Macedo |
| 2013/0294818 A1 | * | 11/2013 | Goedeke ............. C03C 10/0036 |
| | | | 403/270 |
| 2014/0179509 A1 | | 6/2014 | Binhussain et al. |

FOREIGN PATENT DOCUMENTS

| | | | |
|---|---|---|---|
| GB | 424442 A | | 2/1935 |
| GB | 504177 | * | 4/1939 |
| GB | 504177 A | | 4/1939 |
| JP | H05-116987 A | | 5/1993 |
| JP | 4556274 B2 | | 10/2010 |

OTHER PUBLICATIONS

Wikipedia article titled "Metakaolin" https://en.wikipedia.org/wiki/Metakaolin (Year: 2021).*

Wikipedia article titled "Porcelain" https://en.wikipedia.org/wiki/Porcelain (Year: 2021).*

J. Davidovits et al., "Geopolymer: Ultra-high Temperature Tooling Material for the Manufacture of Advanced Composites," Geopolymer Tooling Material, SAMPE 1991, 36, vol. 2, p. 1939-1949.

International Search Report issued in Application No. PCT/US2017/027976 dated Aug. 7, 2017.

* cited by examiner

SEAMLESS, AND/OR GRADED TRANSITION FROM SINTERED ALTERNATIVE-BINDERS-BASED IMPERMEABLE CONCRETE TO GLASS FOR ARCHITECTURAL AND INDUSTRIAL APPLICATIONS

CROSS-REFERENCE TO RELATED APPLICATIONS

This application is a continuation-in-part of International Application No. PCT/US2017/027976, with an international filing date of Apr. 17, 2017, which claims the benefit of U.S. Provisional Application No. 62/322,864 filed Apr. 15, 2016 the entire disclosures of which are hereby incorporated by reference herein.

TECHNICAL FIELD

The present disclosure relates to engineered composite materials (with desired characteristics—to be used in structures at any scale) that could seamlessly and/or progressively transition from an opaque and structural material to a glass; essentially resulting in functionally graded materials with controlled ratio of glass to engineered geopolymer, which becomes an advanced ceramic when post-processed to sinter and transition to glass in order to create a single monocoque structure. The opaque materials are advanced ceramics (specifically the two presented here are: geopolymer-based ceramic and/or glass-foam-based ceramic). These advanced ceramics can be directly and seamlessly bonded to a translucent or transparent dense glass without the use of an intermediate adhesive or use of a frame. That is, an opaque advanced ceramic structure can include an integrated transparent glass window, as the two can be bonded directly and seamlessly and without any frames, mechanical joints, connective tissue or adhesives such as caulking or epoxy. Such advanced ceramic-glass structure can be prepared by sintering a geopolymer or a glass-foam with a transparent or translucent glass to form a single component in which the interface is visually abrupt or in which the interface is a graded composition with the desired gradient properties from one material to the other (including from 100% glass to 100% GP mortar).

BACKGROUND

Airtight and watertight seams or interfaces between two disparate materials are desirable when constructing a variety of structures for applications in architecture, building construction, industrial design, aerospace and in the arts, etc.

Each field has different reasons for airtight and watertight seams or interfaces between disparate materials. For example, in architectural applications there is a desire to eliminate frames around non-operable windows to avoid a thermal bridge; there is also a desire to create functionally graded materials, structures, and building components (i.e. to have greater strength, density, added thermal, acoustical insulation where needed and avoid waste); for building construction there is a desire for such materials while simplifying the wasteful and imprecise conventions and to promote an impermeable seal; and in industrial design such materials are desired where precision and reliability of a seal between materials are required such as in a range of products from biomedical devices, implants, or prosthetics at a variety of scales to everyday products.

Current solutions for installing a window in a building typically use a metal frame to mechanically fasten glass inside a masonry wall, requiring an array of smaller or compound joints to deal with a number of functional requirements to create the necessary thermal, fluid, vapor, and acoustical barriers and insulating layers, each introducing added complexity, involving numerous building trades, and added costs of materials and labor.

Great efforts have gone into developing multi-pane thermo-acoustic window assemblies to create framed airtight chambers with a vacuum or gas infill to improve thermal and acoustic capacity. These systems require an array of complex components that may snap together or require other types of mechanical joints. To prevent penetration/passage of wind and rain complex window structures are designed composed of inner and outer windows, as well as multiple frames (for example an outer frame forming the opening and a window frame attached to the glass) and multiple casings that need to be joined. They need to accommodate draining spaces and valves, devices to block wind and rain to penetrate and to flow backward into the assembly. See, e.g., U.S. Pat. No. 6,209,269 B1, U.S. Pat. No. 7,637,058 B2, etc.

In addition, the inner frame should be installed inside the outer frame in the field, requiring precision of the fit between the frames, added labor and cost in the production, installation, and any future services and repairs due to the deterioration of parts/components-which can also greatly affect environmental performance.

In addition, work involving joining glass and ceramic or making composites has been disclosed. For example U.S. Pat. No. 2,149,133 A (to Leculr) and U.S. Pat. No. 2,227,770 (to Ungewiss) describe joining glass to porous ceramic materials using a weld or fusing glass onto ceramic. U.S. Pat. No. 6,532,769 B1 (to Meinhardt et al.) discloses a glass-ceramic compound and method to join or seal ceramic components together or to metal components which are useful for joining electrochemical cells; U.S. Pat. No. 7,695,560 (to Macedo) discloses a lower density composite concrete made up of cementitious materials (including cement, sand and fly ash) and foam glass aggregate which is lighter than traditional concrete but mostly can be used as structural support including support panels and flooring or where low density concrete is needed such as high rise buildings. U.S. Pat. No. 8,999,869 (to Goedeke) discloses a low temperature process to provide glass-ceramic joining but more specifically used for fuel or electrolysis cells.

However, there is a continuing need to make possible airtight and watertight interfaces between materials and components without compromising the functional requirements that they satisfy (e.g. structural or thermal functional requirements).

SUMMARY OF THE DISCLOSURE

Advantages of the present disclosure are materials that seamlessly transition from opaque to translucent or transparent, such as functionally graded materials. Such materials are useful as monocoque architectural components (like wall panels) or building fragments with integrated non-operable windows and can be used as a structural component thereof. Such seamless materials are also useful in equipment, vessels, and systems, where high strength and lightweight are needed for example in the inner non-load-bearing skin of structures used in extreme conditions, air/space crafts, and water vessels, among other and can be used as a structural component thereof.

These and other advantages are satisfied, at least in part, by materials that seamlessly transitions from an opaque material to a transparent material. Such materials can comprise an advanced ceramic derived from a geopolymer or similar alkali activated binders, directly and seamlessly bound to a glass. Other of such materials can comprise a glass-foam seamlessly bound to a dense Geopolymer (GP), or a composite material with varying ratios of GP to glass. Advantageously, glass foam can act as additional insulation if sandwiched inside layers of geopolymer derived ceramic.

In practicing aspects of the present disclosure, the geopolymer is produced from metakaolin, a derivative thereof, or fly ash. The geopolymer can be adjusted to have a coefficient of thermal expansion that matches a coefficient of thermal expansion of the dense glass. The geopolymer or derivative thereof or an alkali-activated binder can also include varying amounts of another component such as glass along a length dimension. The glass can be transparent or translucent. The transition from the opaque material to the transparent material can be abrupt or graded.

Another aspect of the present disclosure includes processes of producing materials that seamlessly transitions from a composite opaque material to a translucent or transparent material. Such processes include contacting a geopolymer composite of glass or glass powder or foam and sintering the composite to form a gradual transition of the opaque material to the transparent material to produce, after the sintering, a sintered functionally graded material, with varying degrees of compressive strength, thermal insulation and optical properties.

Another such process includes heating to sinter an assembly of a composite, e.g., glass powder and foaming agents to glass along a gradient to form a glass-foam seamlessly bound to a dense glass. In some embodiments thereof, prior to sintering the glass powder, foaming agents and glass chips are composed to form a gradual transition of the opaque layer to the transparent layer to produce, after the sintering, a sintered functionally graded material.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
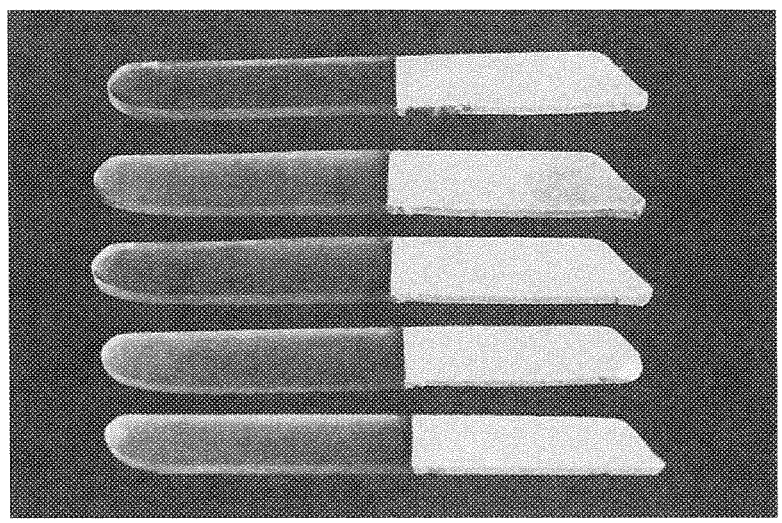
FIG. 1 is a picture of an advanced ceramic (derived from geopolymer) to glass structures in which a metakaolin-based geopolymer ceramic is directly and seamlessly bonded to a translucent glass in accordance with an embodiment of the present disclosure.

The present disclosure relates to two or more materials that can seamlessly transition from opaque to transparent or translucent. The opaque materials can be an advanced ceramic derived from a (Metakaoline, slag, or Fly Ash)-based geopolymer or from glass-foam or a composite thereof. The transparent or translucent material can be glass. Advantageously, the opaque material can be bonded to the translucent or transparent glass without the use of an intermediate adhesive or use of a frame. That is, a geopolymer-based ceramic to glass structure can be bonded directly and seamlessly and without any mechanical joints, connective tissue or adhesives such as caulking or epoxy. Such materials can be prepared to form a visually abrupt joint or a graded composition with the desired rate of growth from one material to the other. For example, to form a functionally graded material, the ingredients can be organized/composed to result in a gradual transition (for example in a linear sequence) to produce a functionally graded material (as in FIGS. 7 and 8).

As used herein, a functionally graded material refers to a composite with continuously varying composition across a certain volume. The functionally graded materials herein are directly and seamlessly fused to a glass. Such composites can be designed to have varying chemical and structural properties across a certain volume to satisfy different optical, structural and environmental properties and can be used for various structures such as a monocoque or seamless structure. Such composites, when matured/cured, can exhibit seamless and/or progressive transition from an opaque structural material to glass making possible an airtight and watertight transition (between the two areas). Advantageously, the advanced GP-based ceramic to glass transition avoids mechanical and chemical bonds; making possible integrated transparency; exhibiting multiple optical characteristics, and impermeable transition across and through a single surface/wall; thereby avoiding layers of different materials (with desired characteristics). Such materials can be prepared by sintering an engineered geopolymer powder with a glass (powder, chunks, or sheets, or recycled-as needed) to form an advanced ceramic-glass composite structure in which the interface is visually abruptly or in which the material is a graded composition with the desired rate of transition from one material to the other (depending on their ratio)

In addition, the functionally graded materials and seamless joint between disparate materials of the present disclosure can eliminate a vast number of static joints (mechanical and chemical) in a building without undermining functional requirements. In an aspect of the present disclosure, the functionally graded materials and seamless joint between disparate materials of the present disclosure can be used in the construction industry (and Industrial Design). For example, the functionally graded materials of the present disclosure permit seamless and direct transition from opaque to glass structures such as in a wall, where a skylight is placed on a roof, and the simplification of details between wall and roof condition. Such joints reduce heat loss and thermal-bridge around windows and overall through the building envelope. Such materials and joints can also be advantageously included in equipment, vessels, and systems, where high strength and light weight are needed; also building in harsh weather where impermeability between and through surface materials are required and allow for a more sustainable practice in production processes and in building performance (e.g., less embodied and operational energy). The use of this technology will also facilitate streamlining production and use of geopolymer composites in the building industry, where multiple advantages of geopolymer cement over "Portland Cement" are most obvious.

Advantageously, the GP-based ceramic to glass materials of the present disclosure can have a flexural strength of no less than about 21 MPa, an approximate compression strength of no less than about 50 MPa, an elastic modulus of no less than about 17 GPa, or any combination or subcombination thereof. Our experiments show that the strength at the interface between the geopolymer derived ceramic to glass or glass-foam to dense glass is strong. When failure of the material occurs, it does not occur at the interface of the opaque to glass transition.

The opaque to transparent or translucent materials of the present disclosure make possible an airtight and watertight transition between the two disparate materials. Such joints are useful in creating structures for harsh conditions (terrestrial shelters as well as outer-space habitats, aerospace engineering), the arts, industrial design, and particularly architecture, permitting novel construction details, spatial conditions, surface conditions, and insulation against sound, water, moisture, gases, or air.

In an aspect of the present disclosure, a ceramic to glass structure comprises a ceramic derived from a geopolymer. Geopolymers (GP) are cementitious materials that can replace Portland cement with many advantages. GP concrete has higher compressive strength than regular concrete, faster curing times, and no significant shrinkage. It is not as permeable as regular concrete, resists freezing, is fire resistant and more stable even in high temperatures of 1200° C. (2200 F), is chemical resistant, is less brittle, and is not likely to corrode. Useful geopolymer for the present disclosure include inorganic aluminosilicates such as poly(sialate-disiloxo) type (—Si—O—Al—Si—O—Si—O—). Additional geopolymers as disclosed by Davidovits et al., Geoploymer Tooling Material, SAMPLE 1991, 36(2), 1939-1949, can also be employed. Also an alkali-activated binder (AAB) material can be used as the opaque material in the present disclosure. Such materials form through a chemical reaction between the high alkaline solution (mostly sodium silicate solution) and aluminosilicate source powders such as slag and fly ash. The resultant product of AAB is similar to geopolymer. Different AABs have been exemplified in the Examples including alkali activated fly ash (AAF), alkali-activated slag (AAS) or binary of fly ash and slag (AAFS). Alkali activators include solutions of Li, Na or K hydroxides and Li, Na or K silicates.

Any glass can be used in the geopolymer-based ceramic-glass joints of the present disclosure including translucent or transparent glass panels typically use for building materials, for example silica-soda-lime, alumino-silicate or borosilicate glasses. Typically the glass is made of silicon dioxide and other oxides (Na, K, Ca, Li, B, Al) and has a coefficient of thermal expansion of between about 4 and 10 ppm, and has a density of between 2.2 and 2.6 g/cm$^3$.

In an aspect of the present disclosure, the coefficient of thermal expansion (CTE) of the geopolymer or similar material is adjusted to match the CTE of the particular glass used to form the advanced-ceramic-glass joint. Matching the CTE of this ceramic and glass advantageously reduces or eliminates stress and cracking at the interface. The CTE of the geopolymer can be adjusted by adjusting the alkali (e.g., potassium) content of the geopolymer as well as by the addition of suitable additives in particulate form. In an embodiment of the present disclosure, the CTE of an advanced ceramic and the CTE of a glass bound directly and seamlessly thereto are within about 10%, e.g., within about 8%, 6%, 4% and even as close as within about 1-3%.

The ceramic derived from geopolymer can be seamlessly interfaced with dense glass, e.g. translucent or transparent glass, creating both structural and optical continuity. For example, the advanced-ceramic to glass structure can be prepared by placing a translucent or transparent glass in contact with a geopolymer in monolithic or powder form and sintering to form the advanced-ceramic to glass structure. The geopolymer component can be employed in an as-produced form (material synthesized at room temperature or <100° C.), or after firing it at a temperature higher than 400° C., or as a mixture of fired and unfired geopolymer. This process converts the geopolymer to a ceramic material, improving its mechanical-physical properties. Geopolymers of the present disclosure can be cost effective and safe to make and also an excellent substitution for Portland Cement, which not only has significant drawback associated with its production, but its strength is significantly decreased in case of fire.

The advanced geopolymer-based ceramic to glass structures of the present disclosure makes possible an airtight and watertight transition between the two disparate materials by bonding them at temperatures higher than 600° C. (in our experiments 850° C. to allow glass to soften effectively) making possible an integrated glass window, exhibiting multiple optical characteristics across a single plane.

For example, geopolymers fired at T>600° C. have low thermal conductivity and are lightweight due to their closed porosity. Further, both dense and porous geopolymers can be obtained at room temperature and successively transformed to ceramic materials after firing. Geopolymers present low thermal conductivity and are lightweight due to their high closed porosity. Glass-ceramics (ceramics made through the controlled crystallization of a glass) can also serve as the ceramic in this application.

In addition, geopolymer-based ceramics are refractory and can be used where there is a need for insulation in proximity to high heat such as fireplaces, in replacement for asbestos, concrete and bricks. The seamless bonding of such materials is useful in equipment, vessels, and systems, where high strength and lightweight are needed for example in the inner non-load-bearing skin of structures used in extreme conditions, air/space crafts, and water vessels. In the construction industry, panels or monocoque components made of geopolymers can be sandwiched and bonded between thin layers of glass for added stiffness and strength, to serve as cladding in addition to their inherent insulating value.

An additional advantage to an aspect of the present disclosure is the use of environmentally friendly materials (such as recycled glass) and process (bonding GP to glass.)

Figure 4:
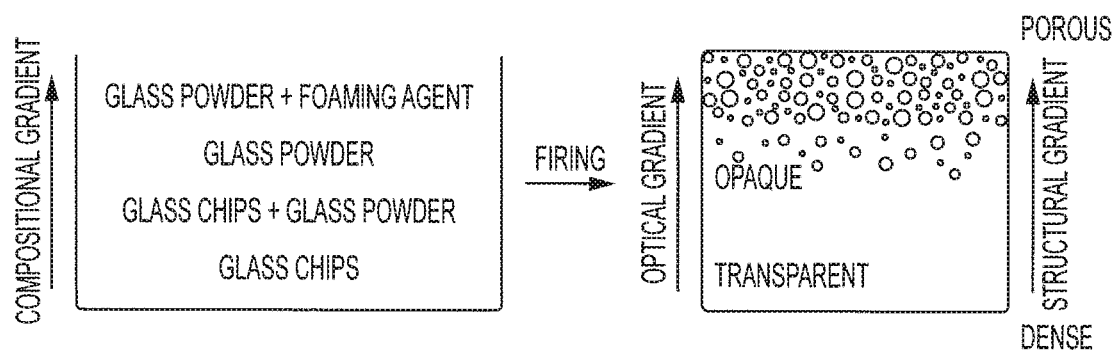
FIG. 4 schematically illustrates a strategy for forming a graded transition from transparent glass (bottom) to an opaque glass-foam (top) structure. Such a material can be formed by firing an assembly of glass chips on the bottom to create a transparent glass layer, then glass chips mixed with glass powder to create a translucent layer, then glass powder to create an opaque layer, and then on the very top a mixture of glass powder and foaming agent that will result in an opaque, glass-foam layer after firing.

Another aspect of the present disclosure includes an opaque to transparent structure prepared as a glass-foam to dense glass structure. The glass-foam component can be seamlessly interfaced with the dense glass, e.g. translucent or transparent glass, creating both structural and optical continuity. For example, a transition from an opaque glass-foam to transparent glass layer can be formed by a compositional gradient of glass chips which are progressively mixed with fine glass powder. FIG. 4 illustrates such a compositional gradient and the result of firing such a composition. Alternatively, a transition from an opaque glass-foam to transparent glass layer can be formed by kiln forming techniques, where a mixture of glass powder and foaming agent is placed adjacent to a piece of soda-lime window glass and fired at 850° C.

In an embodiment of the present disclosure, a glass-foam seamlessly bound to a dense glass can be prepared by sintering/firing an assembly of glass foaming agents and glass along a gradient. For example, sintering/firing an assembly including: (i) a mixture of glass powder and foaming agent to form an opaque layer, (ii) an optional composition of glass chips mixed with glass powder to form an optional translucent layer, and (ii) glass chips to form a transparent layer, can form the glass-foam to a dense glass structure wherein the glass-foam is directly and seamlessly bound to the dense glass.

By processes disclosed herein, two or more disparate materials can be united, achieving seamless and/or sequential growth from one to the other. In particular, sintering or casting transparent glass with an advanced ceramic derived from geopolymer can be used to make the GP-based ceramic to glass structures. In addition, the coefficient of thermal expansion of the geopolymer can adjusted to match the coefficient of thermal expansion of the particular glass used in forming the ceramic-glass joint to develop a strong interface.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Examples of GP Bound Directly to Glass

Production of GP:

Starting materials for the production of GPs were Metapor® (provided by Poraver) and the potassium silicate KASIL6® (12.7 wt % K2O, 26.5 wt % SiO2, 60.8 wt % $H_2O$) (provided by PQ Corporation). Metapor®, an industrially available metakaolin, was used by calcining the metakaolin in an interval comprised between 800 and 850° C. and then mixed with foam glass powders of Poraver®. Although this example employed Metapor® and Poraver®, other metakaolins and sodium/potassium silicates could be used with appropriate adjustments to prepare the GPs.

Starting materials were dissolved by lithium metaborate fusion and run on a Perkin-Elmer Optima 5300 ICP (inductively coupled plasma emission spectrometer), rock standards were used to calibrate the results. The chemical analysis is reported in Table 1.

TABLE 1

|  | Metakaolin Wt. % | Soda lime glass Wt. % | GP* Wt. % |
| --- | --- | --- | --- |
| $Al_2O_3$ | 19.4 | 0.1 | 14.4 |
| CaO | 6.0 | 9.1 | 4.4 |
| $Fe_2O_3$ | 0.7 | — | 0.5 |
| $K_2O$ | 0.4 | — | 8.7 |
| MgO | 0.5 | 4.0 | 0.4 |
| $Na_2O$ | 9.5 | 13.0 | 7.0 |
| $SiO_2$ | 62.4 | 72.1 | 63.8 |
| $TiO_2$ | 0.9 | — | 0.7 |
| Others | 0.2 | 1.7 | 0.1 |

*Oxide composition of the dehydrated GP was calculated from the chemical composition of the MK and Ksil.

Preliminary investigations were performed to obtain GPs having the same coefficient of thermal expansion (CTE) as soda lime glass after firing at 850° C. Control of the CTE was obtained by preparing GPs pastes with a fixed amount of metakaolin (MK) and mixing different alkali activating solutions of potassium silicate (KSil). The percentage of alkalis in an amorphous aluminosilicate matrix was used to tailor the CTE, with the understanding that by increasing the potassium (i.e. alkali) content the CTE increases.

To produce the GP pastes, the activating solution was stirred with a hand mixer and the metakaolin powders were slowly added for 15 minutes to form a homogeneous paste. The pastes were then poured in plastic containers and cured in closed boxes to prevent moisture evaporation. After curing, chips of soda lime glass (SLG) were placed on top of the cured pastes and fired at 850° C. for 60 min applying a 10° C./min heating rate to ceramize the geopolymer in contact with the molten glass.

Samples were cooled at 5° C./min and annealed at 570° C. for 60 min, then the temperature was decreased at 1° C./min to room temperature. The fired samples were first examined using a stereomicroscope until a composition exhibiting no cracks was found. Successively the CTE was controlled using a dilatometer, verifying a good match between the two materials with no cracks formation as determined by scanning electron microscopy (SEM FEI Nova NanoSEM 630 FESEM).

After the preliminary experiments an optimal composition was found to be 100 g of KSil with 112.5 g of MK which was prepared by placing the KSil in a container with about 5 wt. % of water with stirring to decrease the viscosity of the solution, successively 112.5 g of MK were slowly added forming a homogeneous paste.

To investigate the mechanical properties of the interface between glass and the ceramized GPs, the GP was dehydrated at 200° C. for 60 min and then ground to particles below 200 μm. The preliminary dehydration of the powders limits the shrinkage and associated development of cracks after firing. Suitable temperatures for the dehydration range from 100 to 300° C., and dehydration times of 1 h or more are suitable. Heating and cooling rates can be selected in a wide range of values, as they do not affect significantly the dehydration process. Particles could be ground to other sizes as well (e.g. 10 micron to 1 mm), depending on the specific characteristics that are desired in the final component and application (e.g. density, total porosity, pore morphology of fired GP). The powders were placed in a ceramic mold (5×5 cm$^2$) and hand pressed in contact with a soda lime glass slab and fired at the desired temperature (the desired firing temperature is in the range 600 to 900° C., depending on the type of glass employed). Heating rates of 2 to 10° C./min can be applied, and firing times can range from 0.5 to a few hours. By this process, a ceramic derived from the GP component was seamlessly and directly bound to the glass creating both a structurally and optically continuous Geopolymer-based ceramic-glass joint. See FIG. 1.

The integration and mechanical properties of the geopolymer-based ceramic-glass structure was then investigated. In this regard, Four-point bending tests (40 mm outer span and 20 mm inner span) were performed using an Instron 5866 (Instron, Danvers, Mass.) on 10 specimens with dimensions of 3×6×50 mm$^3$. In order to remove surface flaws, all samples were carefully polished to a 6 μm finish before testing, using abrasive papers and diamond paste. The edges of the bars were beveled using fine abrasive papers and diamond paste. The cross-head speed was 1 mm/min until fracture.

The geopolymers and derived ceramics were also tested. For example, the geoploymer powders were subjected to simultaneous DSC-TGA (SDT Q600, TA Instruments, New Castle, Del.) on alumina crucibles at 10° C./min in 100 ml/min air flow. The morphological features of sintered samples were characterized by scanning electron microscopy. The crystalline phase assemblage was investigated on powdered samples by X-ray diffraction (Bruker D8 Advance, Karlsruhe, Germany), employing Cu Kα radiation (0.15418 nm), with data being collected in the range 2θ=10-60 (in 0.05° steps, with a 3 s counting time). Water absorption, WAe, and apparent density, $\rho_a$, were determined according to the UNI EN ISO10545-3 standard protocol. The bulk density, $\rho_b$, was obtained by considering the mass to volume ratio for 5 selected samples. The density of the solid, or true density, $\rho_t$, was evaluated by means of helium gas pycnometry (Micromeritics AccuPyc 1330, Norcross, Ga.), on powders sieved below 63 μm. The three density values ($\rho a$, $\rho b$ and $\rho t$) were used to compute the amounts of open and closed porosity. These observations enable us to exercise more control over the products.

Table 2 summarizes the mechanical properties of the fired GP samples (100% geopolymer) and GP to glass samples (GP joined to glass). Firing the GP forms a lightweight ceramic, showing a total porosity of 42.6% that was present mostly as closed cells as demonstrated by the very low water absorption (0.7%). Furthermore, the bending and compressive strengths were evaluated to be about 21 MPa and 50 MPa, respectively.

Table 2 Characterization data for samples being or flexural strength, $\sigma_c$ compression strength, $E_f$ elastic modulus, $\rho_b$ bulk density, $\rho_a$ apparent density, $\rho_t$ true density, $\rho_{rel}$ relative density, $\sigma_c$ compression strength, OP open porosity, CP closed porosity, and TP total porosity. GP=sample made only of fired GP powder; GP-SG=sample made of fired GP powder joined to glass.

TABLE 2

| | $\sigma_f$ MPa | $\sigma_c$ MPa | $E_f$ GPa | $\rho_b$ g/cm$^3$ | $\rho_a$ g/cm$^3$ | $\rho_t$ g/cm$^3$ | OP % | CP % | TP % | $W_{ab}$ % |
|---|---|---|---|---|---|---|---|---|---|---|
| GP | 21 ± 1 | 50 ± 10 | 17 ± 1 | 1.45 ± 0.03 | 1.50 ± 0.01 | 2.53 ± 0.01 | 3.2 | 39.4 | 42.6 | 0.7 |
| GP-SG | 21 ± 2 | — | 23 ± 2 | — | — | — | — | — | — | — |

Note:
SG represents soda-lime glass

It was further observed that the GP-ceramic-glass joint samples cracked always in the ceramic layer and never at the ceramic-glass interface, thus confirming a maximal integration between the two layers.

Figure 2:
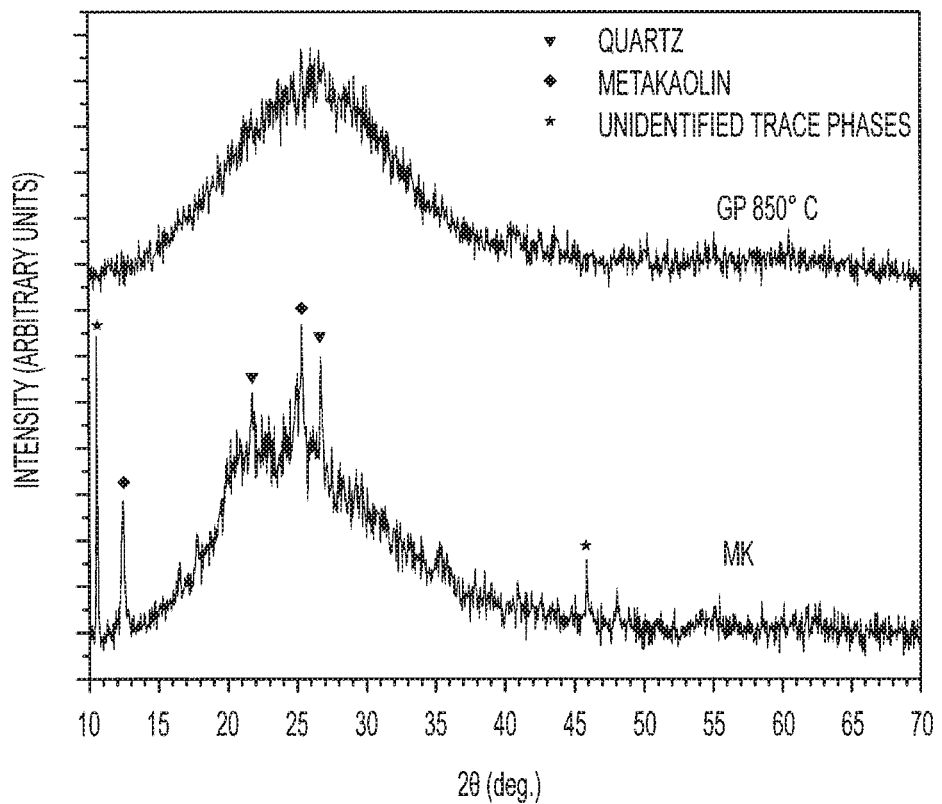
FIG. 2 is a plot of an XRD analysis of a starting metakaolin (MK) and GP fired at 850° C. The data confirm that firing the GP at 850° C. leads to an amorphous phase compatibile with glass.

FIG. 2 is a plot of an XRD analysis showing quartz, metakaolin and limited unidentified trace crystal phases present in the starting metakaolin. The broad band of the XRD pattern of the GP fired at 850° C. suggests the formation of an amorphous ceramic. Comparing the XRD results shows how firing GP to 850° C. results in formation of more amorphous phases shown by broad peak or background hump in FIG. 2; however the XRD results of initial MK reveal the existence of more crystalline peaks as Quartz or Metakaolin.

Figure 3A:
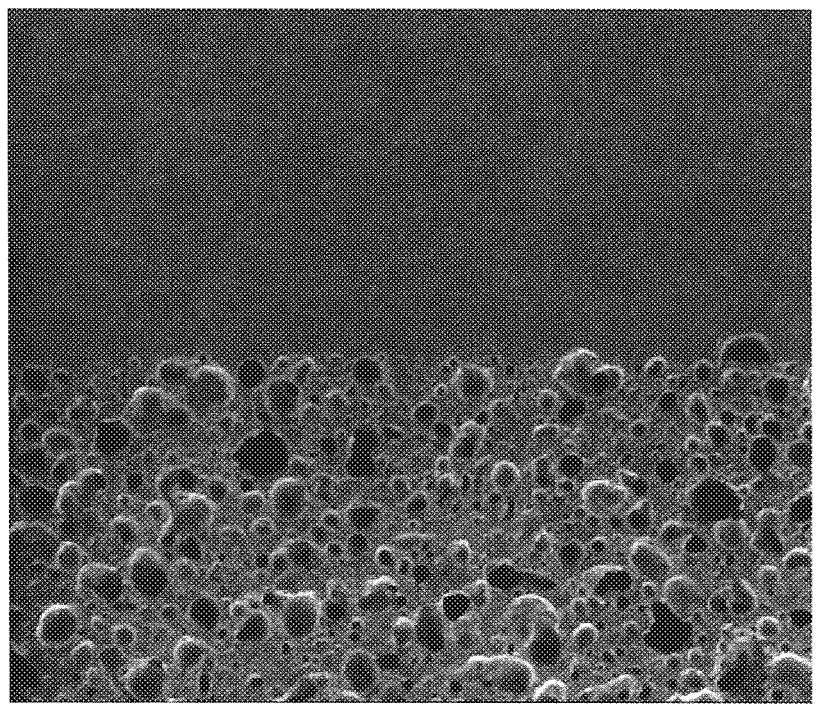
FIGS. 3A and 3B are SEM images showing a seamless transition from a dense glass (on top) layer to a metakaoline-based geopolymer ceramic of a functionally graded material prepared according to an embodiment of the present disclosure. Although the geopolymer can be porous if set at room temperature, in this example it has transformed into a sintered ceramic body with closed porosity because it was heated to above 600° C.
Figure 3B:
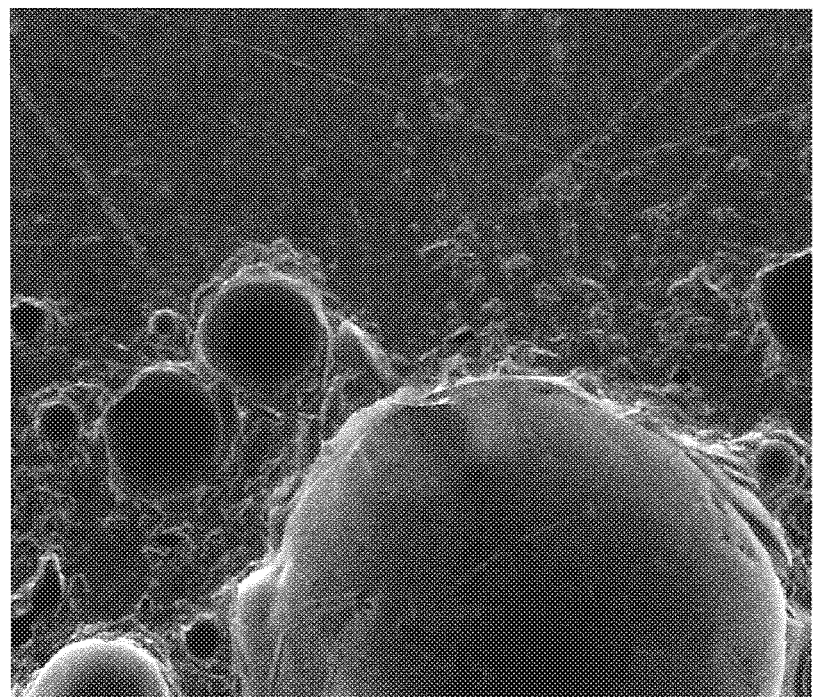

SEM images, as shown in FIGS. 3A and 3B, demonstrate a seamless transition from a dense glass layer to a porous ceramic derived from the GP for the prepared ceramic to glass structures. The control of the CTE provided a good match between glass and GP-based ceramic which is evidenced by a total absence of micro cracks at the interface.

While the foregoing examples employed Metapor® and Poraver® to prepare geopolymers, the geopolymer can be obtained with different metakaolins and/or different combinations of alkali silicates in order to match the CTE of soda lime glass. Moreover different types of glass can be used in alternative to soda lime glass.

Example of Glass-Foam to Dense Glass Structure

A transition between a dense, transparent glass to a glass-foam can be made according to the present disclosure in multiple ways, i.e. casting a composition with a gradient of glass chips, glass powder and foaming agents to create an interface between glass and GF using different thickness of glass, as well as by kiln forming techniques, where a mixture of glass powder and foaming agent is placed adjacent to a piece of soda-lime window glass and fired at 850° C.

For example, a transition from a transparent glass layer to an opaque glass-foam suitable for applications in architecture can be formed by a compositional gradient of glass chips which are progressively mixed with fine glass powder. FIG. 4 illustrates such a compositional gradient and the result of firing such a composition. For example, when firing at 850° C. the glass chips form a transparent layer, whereas the glass powders act as an opacifier. The structural gradient is realized mixing the glass powder with a progressively increased amount of foaming agent. During firing the glass will sinter and bloat as an effect of the thermal decomposition of the foaming agent.

Glass-foams were manufactured by pouring, in a mold, a mixture of glass powder with 1-2 wt. % of silicon carbide (SiC), a typical foaming agent. Heating the mixture until 850° C. caused the glass to soften with viscous flow sintering and SiC oxidation. The reaction products of SiC with environmental oxygen are $SiO_2$ and $CO/CO_2$ gases that bloated the glass during sintering. As a result of firing, a grey pumice like foam was obtained.

Figure 5:
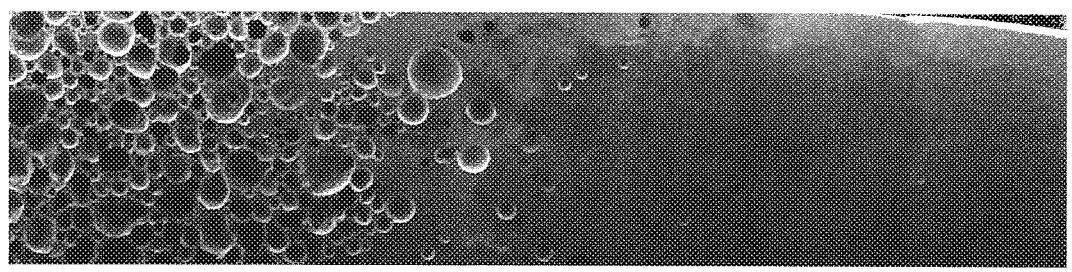
FIG. 5 is an SEM image of gradient structure of a porous glass-foam (far left) to a dense glass (far right) prepared according to an embodiment of the present invention.

The interface between glass and GF for structures prepared in this experiment was studied through Scanning Electron Microscopy (SEM), no cracks were observed and a maximal match between the two layers was obtained. As provided in FIG. 5, an SEM image shows a progressive transition from glass-foam (on the left) to translucent glass (in the middle) and finally to dense transparent glass (on the far right).

Figure 6A:
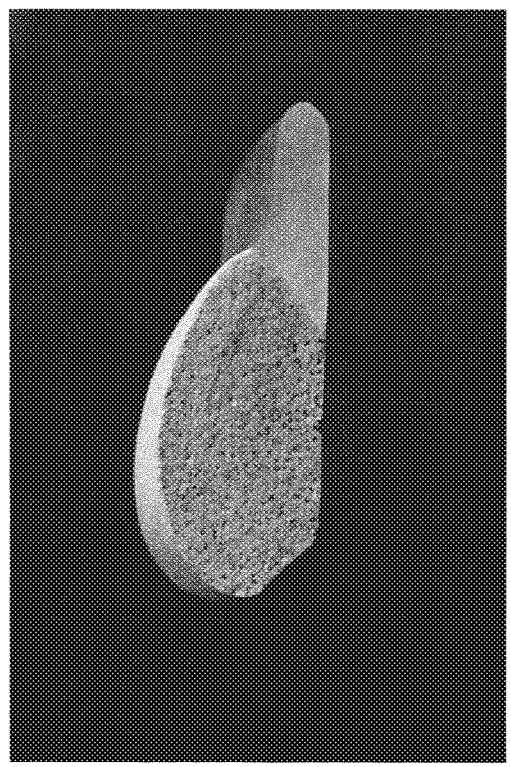
FIGS. 6A and 6B are pictures of a glass-foam to glass structure in which the glass-foam is seamlessly transitioned to a transparent glass in accordance with another embodiment of the present disclosure.
Figure 6B:
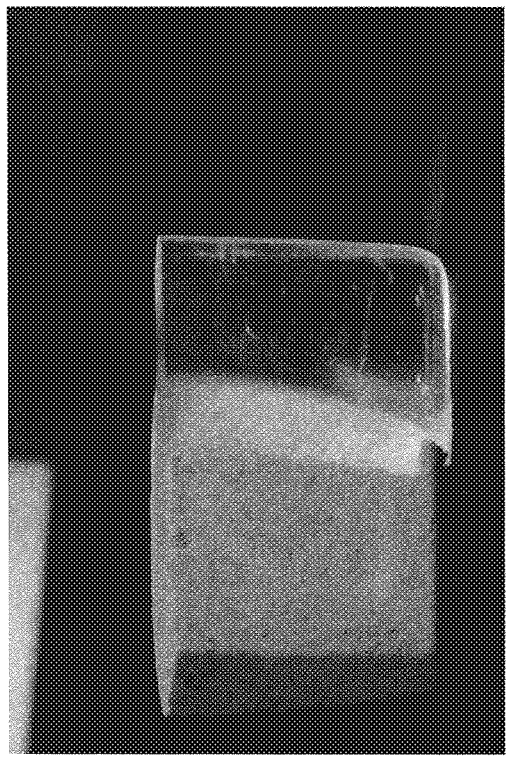

In an alternative process of forming a glass to glass-foam structure, a mixture of glass powder and foaming agent is placed adjacent to a piece of soda-lime window glass and fired at 850° C. FIGS. 6A and 6B show pictures of such a structure. As shown in the figures, a sharp transition from glass-foam to dense glass can be obtained by firing a glass slab in contact with a mixture of glass powder mixed with foaming agent.

Example of Functionally Graded Material Using Alkali Activated Binder Materials

Alkali activated binder materials can be used in place of or in addition to geopolymers. For example, the solid materials (precursor) used to make alkali activated binder (AAB) in this study were: a class F fly ash (FA) meeting ASTM C618-15 requirements which is provided by Headwaters Resources in PA, and a grade 100 ground granulated blast furnace slag (GGBFS) meeting ASTM C989M-12. Table 3 below presents the chemical compositions of FA and GGBFS before activating them with an alkaline solution.

TABLE 3

| Oxide compositions (mass %) of FA, and GGBFS powders | | | | | | | | | |
|---|---|---|---|---|---|---|---|---|---|
| Oxides | $SiO_2$ | $Al_2O_3$ | CaO | $Fe_2O_3$ | MgO | $SO_3$ | $Na_2O_{eq}$ | LOI | Sp. Gr. |
| FA | 46.69 | 22.44 | 4.99 | 19.43 | 1.04 | 0.76 | 1.74 | 2.00 | 2.64 |
| GGBFS | 30.80 | 11.45 | 47.50 | 2.26 | 3.65 | 3.03 | 0.27 | 2.56 | 2.85 |

*Note:
Sp. Gr. is the specific gravity of each powder

Three AAB mixtures were designed (Table 4). The mixtures were labeled as: AAS (representing an alkali activated Slag), AAF (representing an alkali activated Fly ash), AAFS (representing a hybrid binder of 80% (vol) Fly ash and 20% (vol) Slag). To prepare the activator solutions, a commercially available aqueous sodium silicate was mixed at different proportions with sodium hydroxide (NaOH) solution. The commercial aqueous sodium silicate consisted of 18.4% mass Na2O, 28.4% SiO2, and 53.2% H2O, and had pH=13.7 and specific gravity of 1.60 at 20° C.

TABLE 4

| Mixture ID. | pH | n = ($SiO_2/Na_2O$) molar-based |
|---|---|---|
| AAS | 14.60 | 0 |
| AAFS | 14.63 | 0.94 |
| AAF | | |

The alkali activated binder materials can be used in place of geopolymers to make functionally graded structures according to the present disclosure.

Example of Functionally Graded Material

Figure 7:
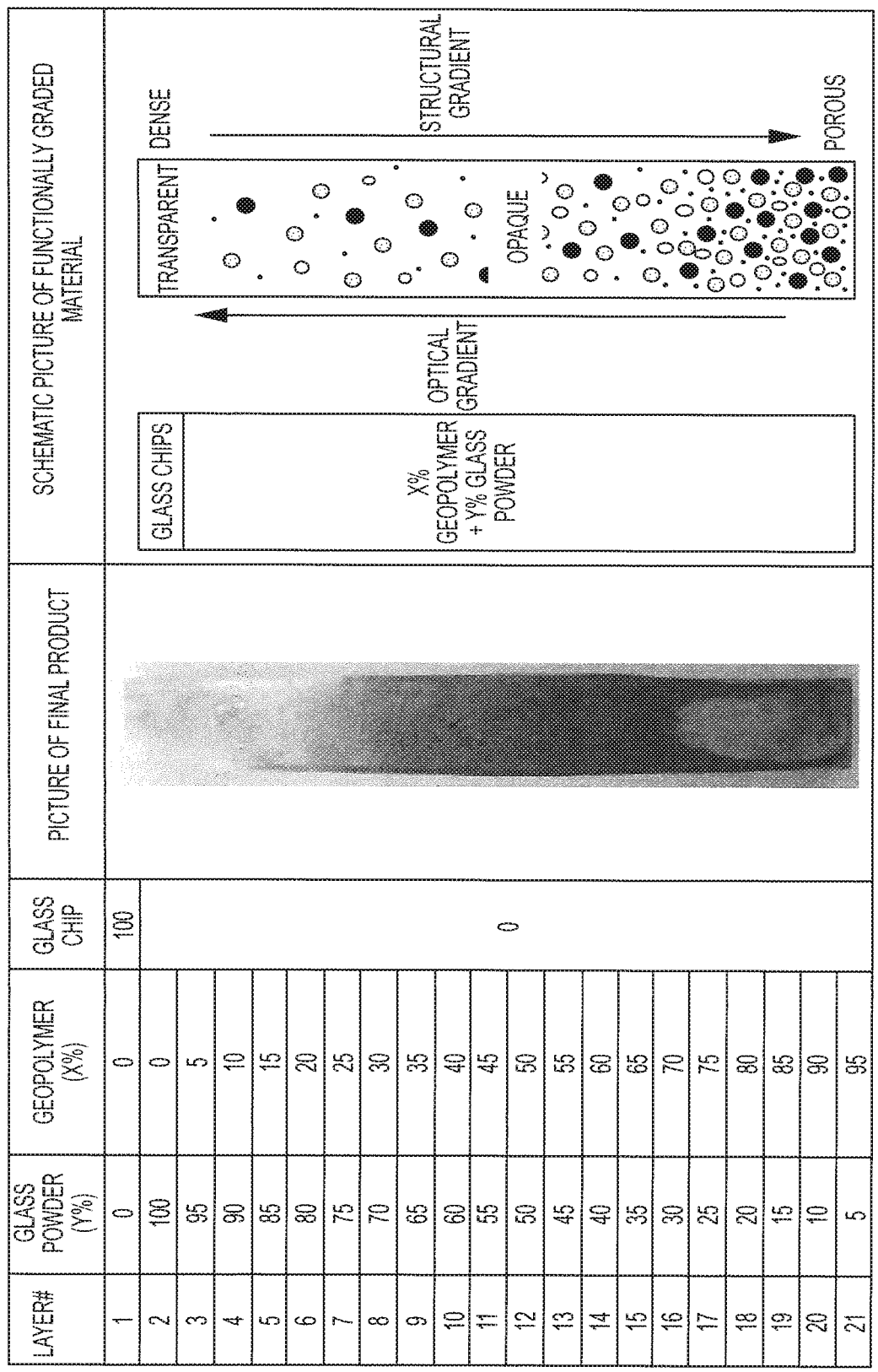
FIG. 7 illustrates a process for forming a graded material transiting from transparent glass (top) to an opaque composition of Fly Ash based geopolymer (bottom), and a 21-layer column of functionally graded material

Functionally graded advanced ceramic can be made by continuously and integrally varying a glass and geopolymer and/or alkali-activated binder (AAB) material across a volume (e.g., across a length dimension) of the advanced ceramic. For example, the schematic diagram in FIG. 7 illustrates a process for forming a graded material transiting from transparent glass (top) to an opaque composition of Fly Ash based geopolymer (bottom). The sample for this experiment measured 2 inches by 1 inch by 16 inches and included 21 layers: Staring from the top 100% glass, the ratio of glass drops about 5% in each successive layer (so 95% glass and 5% GP in the second from top layer) down to 5% glass and 95% GP on the very bottom. As such the structural strength on the bottom is higher and the top layer which in this specimen is translucent could be 100% transparent if the firing schedule was adjusted. For these formulations, control of temperature was important in the firing schedule during sintering and anneal treatment.

Figure 8:
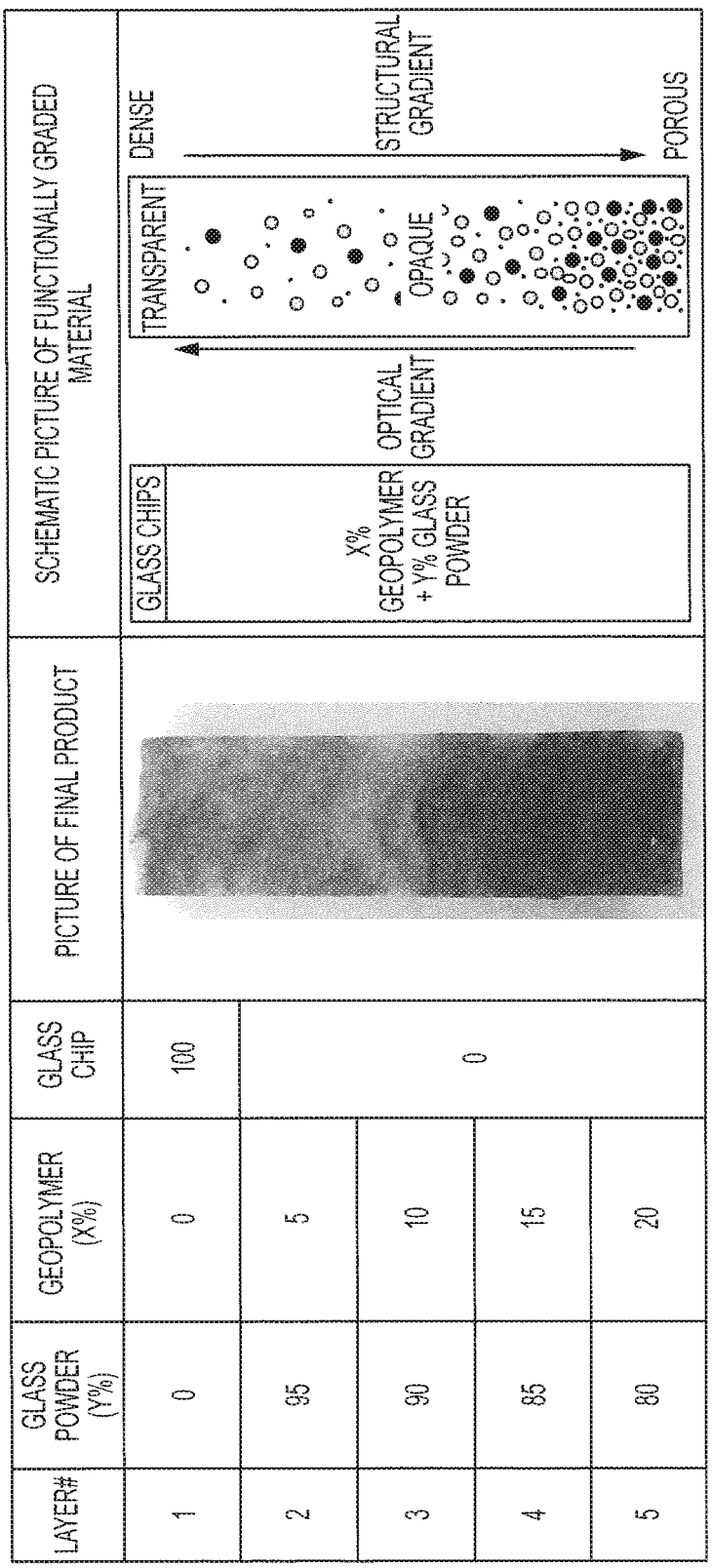
FIG. 8 shows a 5-layer column of functionally graded material made of iron-free glass powder, geopolymer and glass chips, (the glass chip layer was exposed to the air (top layer)).
Figure 9:
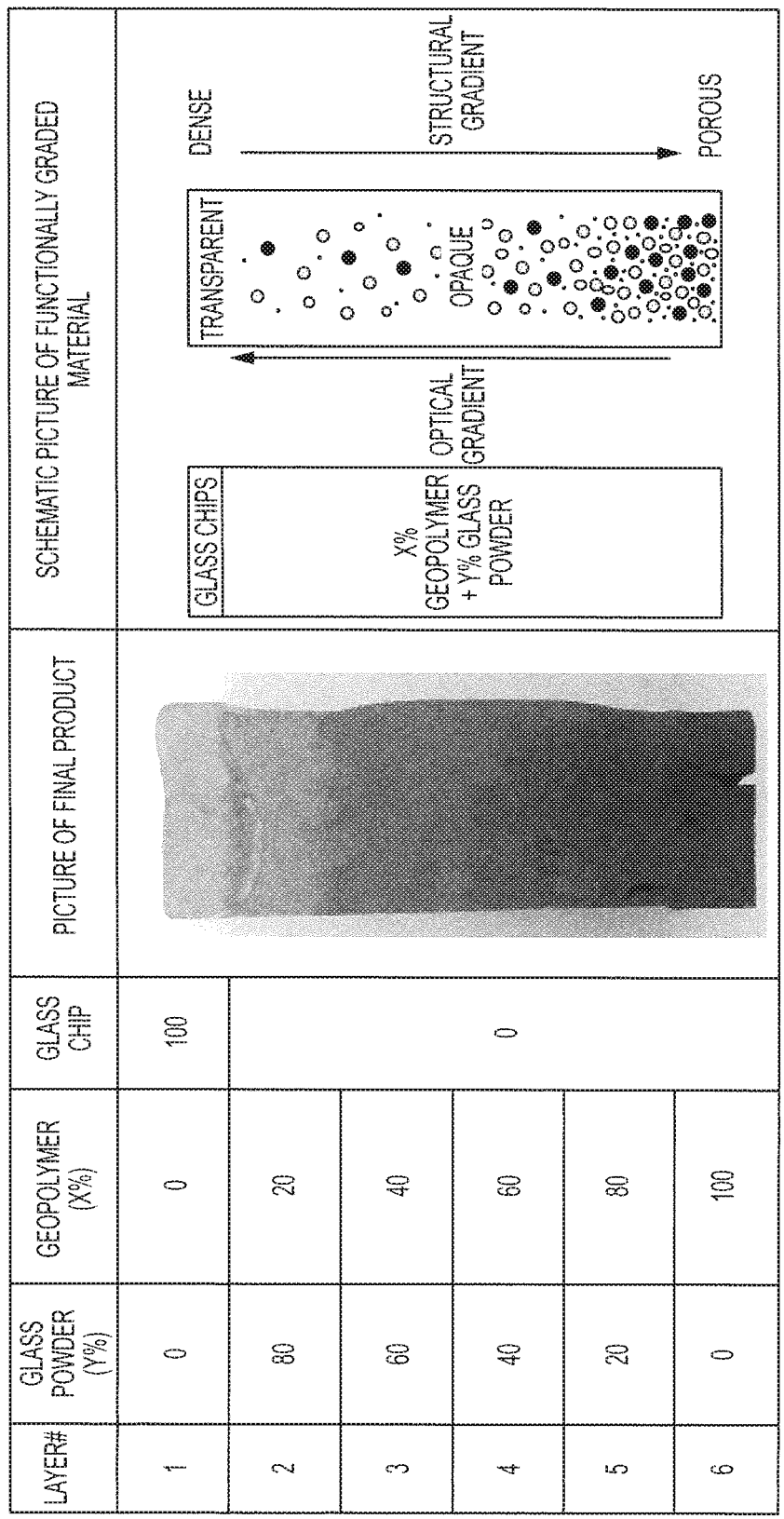
FIG. 9 shows a 6-layer column of functionally graded material made of soda-lime glass and geopolymer and the glass chip layer exposed to the air (top layer).
Figure 10:
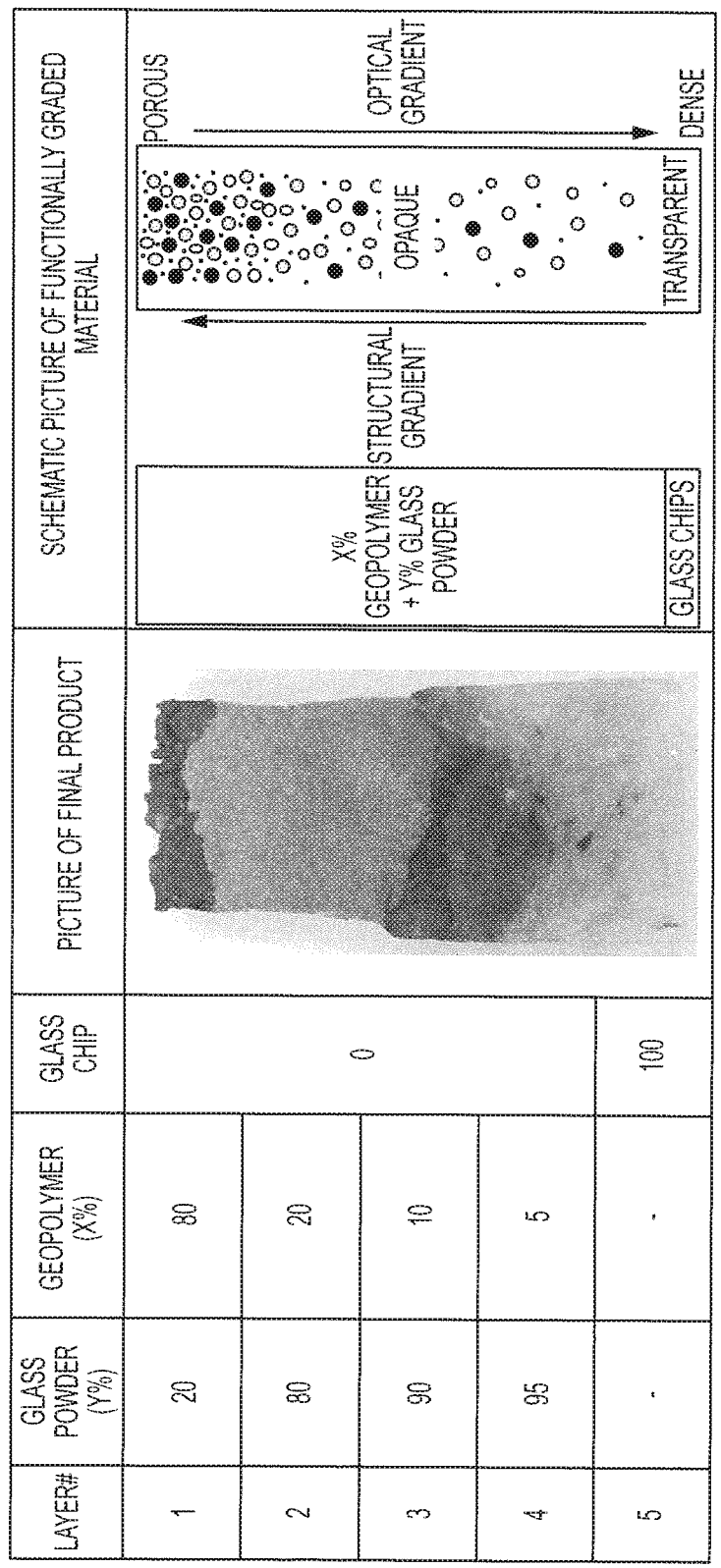
FIG. 10 shows a 5-layer column of functionally graded material made of soda-lime glass and geopolymer and the glass chip layer exposed to the air (top layer).

FIGS. 8, 9 and 10 illustrate how the composition of glass (iron-free glass powder vs. soda-lime glass powder), exposure conditions (which layer is at the very top) and the gradual change of material can affect the final product of functionally-graded materials. FIG. 8 shows a 5-layer column of functionally graded material made of iron-free glass powder, geopolymer and glass chips, (the glass chip layer was exposed to the air (top layer)). FIG. 9 shows a 6-layer column of functionally graded material made of soda-lime glass and geopolymer and the glass chip layer exposed to the air (top layer). FIG. 10 shows a 5-layer column of functionally graded material made of soda-lime glass and geopolymer and the glass chip layer exposed to the air (top layer).

We studied the density, pore size, distribution, interconnectivity of the pores, and fusion homogeneity of the Functionally Graded Material in the sample of FIG. 9. Studies were done at The Center for Quantitative Imaging (CQI) at Penn State University Park Campus, a facility that houses a General Electric v|tome|x L300 nano/microCT that offers high resolution imaging with feature detectability of 1 micron, and 1200 mm maximum sample height. This non-destructive system provides three-dimensional imaging of opaque materials, data output is quantitative and can serve as input for numerical modeling. CQI focuses on two main areas of research: monitoring internal processes in experimental systems and characterizing complex 3D structure and material composition in natural and synthetic systems.

We began with a study at 70 microns' resolution and then selected sub-volumes to study at 8.5 resolution in more detail where lack of connectivity near the surface for example is observed indicating that the geopolymer (mixed at any ratio with glass), although essentially porous has a closed porosity at the surface; therefor impermeable—meaning no gas or liquids can penetrate into and through the material after sintering at temperature beyond 600 C.

CT X-Ray Inspection enabled us to produce High Resolution Mosaic images, providing information about density gradation along the sample from 100% GP to 100% transparent glass. Average of density value was obtained in the six sub-layers (of the 6-layer FGM sample) and compared per sublayer. It is noticeable that the highest density is achieved in 100% glass zone, likely to provide high sealing conditions. Additionally, we observed that pore network connections do not exist near the edge (indicating impermeability).

A parameter to consider in porous materials is the pore structure. Previous study indicated that the pores smaller than 10 micro meter can effectively influence the material properties such as strength, shrinkage, permeability among others. Because optical microscopy can detect just the pores larger than 8.5, a new test was needed to study the distribution of meso and micro pores in different layers along the FGM samples and also from the internal to external zones. A method which will minimize the disturbance during the specimen preparation process is a mix of the focused ion beam (FIB) and scanning electron microscope (SEM). FIB is able to directly cut or mill the specimen controlled with nanometer precision.

The pore structure and phase distribution of a mechanically polished, functionally graded material can be determined via scanning electron microscopy (SEM), which reveals that the pore size varies from a highly dense glass to a complex macro and microporous three-dimensional network in the cement polymer. The pore size distribution and connectivity as a function of depth will be interrogated via focused ion beam (FIB)/SEM. With this approach, 50 µm×50 µm wide cross sections was prepared in each grade so that the pore size distribution and connectivity can be imaged. Scanning Electron Microscopy-Backscattered Electron (SEM-BSE) images of different layers of the functionally graded material were taken. It was observed that increasing the proportion glass resulted in a denser matrix.

Example of Matching Geopolymer and Glass Coefficient of Thermal Expansion

Geopolymer and glass powder together were fused together by being fired and heated up at very high temperatures (up to 850° C.). In order to achieve good bonding between the initial materials at such a high temperature, their coefficients of thermal expansion (CTE) should be close and similar to each other. Previous studies showed that the properties of geopolymer is highly dependent on the properties of alkaline solution (for sodium silicate solution, it includes pH, n-modulus and water content of activating solution). In order to adjust CTE of geopolymer to be close enough to the glass, different solutions have been designed for making geopolymer and CTE of them were measured and compared with CTE of soda-lime glass. In general, the results indicate that CTE of soda-lime glass and geopolymers are close to each other and there is a slight difference between them. The best match has been observed for the geopolymer which is made of the sodium-silicate solution of n=1.60 and pH=13.7 (i.e., m=0.2, r=1.65).

While the claimed invention has been described in detail and with reference to specific embodiments thereof, it will be apparent to one of ordinary skill in the art that various changes and modifications can be made to the claimed invention without departing from the spirit and scope thereof. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A composite unibody structure that seamlessly transitions from an opaque portion to a translucent or transparent portion in a graded composition, the composite unibody structure comprising an advanced ceramic-glass composite structure with varying ratios of a geopolymer or an alkali-activated binder (AAB) material to glass across a length and/or depth of the composite unibody structure, the composite unibody structure comprising:
   the opaque portion made from a composition having a first ratio of the geopolymer or alkali-activated binder (AAB) material to the glass;
   the translucent or transparent portion made from a composition having a second ratio of the geopolymer or alkali-activated binder (AAB) material to the glass, the first ratio higher than the second ratio; and
   a transition portion that seamlessly transitions as a graded composition from the opaque portion to the translucent or transparent portion along a gradual gradient from the first ratio to the second ratio;
   wherein the composite unibody structure is arranged in the graded composition and then sintered.

2. The composite unibody structure of claim 1, wherein the geopolymer is produced from metakaolin, a derivative thereof, or fly ash, or a composite of geopolymer and glass powder.

3. The composite unibody structure of claim 1, wherein the geopolymer or alkali-activated binder (AAB) material is engineered to have a coefficient of thermal expansion that matches a coefficient of thermal expansion of the glass.

4. The composite unibody structure of claim 1, wherein the translucent or transparent portion is transparent.

5. The composite unibody structure of claim 1, wherein the translucent or transparent portion is translucent.

6. The composite material of claim 1, wherein the transition from the opaque material to the transparent material is stepwise graded.

7. The composite material of claim 1, wherein the transition from the opaque material to the transparent material is continuously graded.

8. A process for preparing a composite material of claim 1, the process comprising contacting a geopolymer with a glass and sintering the geopolymer contacted glass to form the material.

9. The unibody composite structure of claim 1, wherein the transition portion gradually transitions from the composition of 100% of geopolymer at the opaque portion to the composition of 100% of glass at the translucent portion.

10. The unibody composite structure of claim 1, wherein the opaque portion is made from a composition having the first ratio of a mortar to glass;
the translucent or transparent portion is made from a composition having the second ratio of a mortar to glass;
the mortar including geopolymer and sand.

11. The unibody composite structure of claim 1, wherein the transition portion gradually transitions from the composition of 95% of geopolymer and 5% of glass at the opaque portion to the composition of 5% of geopolymer and 95% of glass at the translucent portion.

12. The unibody composite structure of claim 1, further comprising an additional opaque portion made from 100% geopolymer or AAB at an end of the opaque portion.

13. The unibody composite structure of claim 1, further comprising an additional translucent portion made from 100% glass at an end of the translucent portion.

14. The composite structure of claim 1, wherein a porosity increases and an optical gradient decreases from the translucent or transparent portion to the opaque portion.

15. The functional graded composite ceramic structure of claim 1 comprising a unibody structure seamlessly transitioning from an opaque end to an translucent end along a length of the unibody structure in a continuously or stepwise graded composition, the unibody structure made from heating a composite mixture in a mold to a sintering temperature, wherein the composite mixture is a mixture of concrete powder and crushed glass, the concrete made from a geopolymer or an alkali-activated binder (AAB) or a mortar, a ratio of the concrete powder to crushed glass and distribution varying along a length and/or depth of the mold based on a desired structural, thermal, and optical performance.

* * * * *